United States Patent [19]
Sabatelli et al.

[11] 3,981,556
[45] Sept. 21, 1976

[54] ELECTRIC CONNECTIONS OF WINDOW DEFOGGING DEVICES

[75] Inventors: Silvino Sabatelli; Ivano Buoncristiani, both of Vasto (Chieti), Italy

[73] Assignee: Societa Haliana Vetro Siv S.p.A., Vasto (Chieti), Italy

[22] Filed: Feb. 6, 1975

[21] Appl. No.: 547,727

[30] Foreign Application Priority Data
Feb. 11, 1974  Italy.................................. 48247/74

[52] U.S. Cl. ........................... 339/275 T; 219/543; 339/256 SP
[51] Int. Cl.²........................................ H01R 11/06
[58] Field of Search ........... 339/256, 258, 275, 252; 219/203, 522, 543

[56] References Cited
UNITED STATES PATENTS

| 2,709,211 | 5/1955 | Glynn | 339/252 |
| 3,534,148 | 10/1970 | Bange | 219/543 |
| 3,634,654 | 1/1972 | Peetz et al. | 339/258 S |

*Primary Examiner*—Joseph H. McGlynn
*Attorney, Agent, or Firm*—Browdy and Neimark

[57] ABSTRACT

An electric connector for electrically heatable window panes including a tin-plated platelet solderable to a bus conductor having a tongue integral with the platelet bent at an angle with the platelet and adapted to be connected to the feed wire, wherein the area of the soldered joint is extended to both sides of the axis of the bend.

8 Claims, 3 Drawing Figures

ELECTRIC CONNECTIONS OF WINDOW DEFOGGING DEVICES

The electric heating systems for the defogging and/or defrosting of windows, particularly the rear windows of automotive vehicles, comprise two bus conductors located adjacently to opposite margins of the rear window pane and interconnected by an array of generally parallel, spaced apart heating wires extending between said two bus conductors. Both the bus conductors and the heating wires are generally printed upon the window pane surface by the silk screen process.

In order to connect said heating systems with the source of electricity of the vehicle, in general the feed wires are not directly fastened to the bus conductors, but to connectors which are in turn applied, as by soldering, to said bus conductors. Such connectors consist of a platelet which is soldered to the bus, and of a tongue to which the feed wire is fastened. The tongue is made integral with the platelet, extends from one of its borders and its surface is at an angle with that of the platelet.

This technique is commonly known and needs therefore no further illustration. One of its important problems, however, is that of obtaining a strong and durable connection between the bus conductors and the above mentioned connectors. The gases developing during the soldering process remain entrapped between the bus and the platelet surfaces, thereby not only affecting the strength of the soldered joint but also permitting the infiltration and stagnation of water within the unsoldered spots with consequent corrosion phenomena in the joint. Another problem is that in the transmission, upon the platelet, of any force acting on the tongue, the latter will act as a lever, the bend between the tongue and the platelet forming its fulcrum.

It is the object of the invention to provide a connector fitted with means for venting the gases formed between the platelet and the bus during the soldering process, so as to prevent the formation of gas pockets in the joint. It is a further object of the invention to provide a connector capable of forming a stronger joint with the bus than those so far known.

According to the invention, the first object is obtained by providing the connector platelet with perforations, which measure not only permits the gases forming during the soldering process to escape through said perforations, but also to realize a firmer hold of the platelet on the bus, by successively filling the perforations with additional solder.

The further object is attained by a connector, wherein the area of the soldered joint does not merely extend over one side of the fulcrum of the tongue, as in the known connectors, where the tongue projects from a border of the platelet, but extends at both sides of said fulcrum.

The invention will be better illustrated with reference to the attached drawings, wherein.

Figure 1:
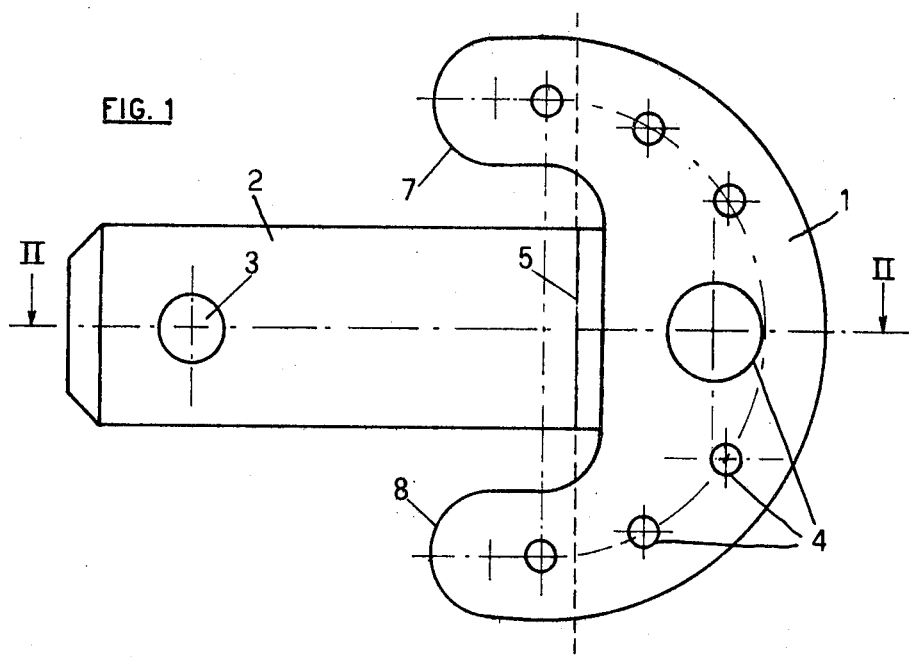
FIG. 1 is a top view of the connector according to the invention.
Figure 2:
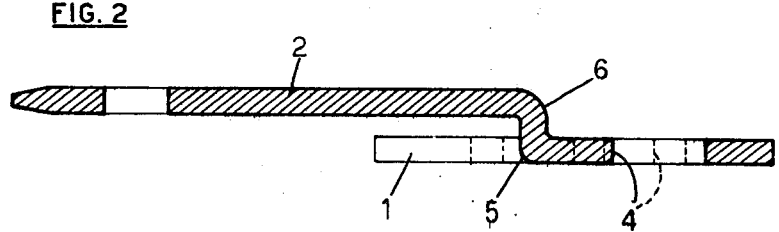
FIG. 2 is a sectional view of the connector according to line II—II of FIG. 1.

In the embodiment of the connector according to FIGS. 1 and 2, at 1 there is indicated a generally C-shaped flat platelet from which extends, integral with it, the tongue 2 fitted, at its free end, with a hole 3, through which the electric feed wire is passed. The platelet 1 is fitted with a plurality of the already mentioned vent holes 4, into which holes, once the platelet has been soldered to the bus, additional solder is poured, so as to form an efficient riveting of the platelet upon the bus. The platelet is tin plated, and is soldered to the bus by simply heating it. In the embodiment of FIGS. 1 and 2 the tongue is bent first upward along the line 5 and then horizontally along the line 6. As it can clearly be seen from all three figures, the area of the soldered joint between the platelet and the bus extends to both sides of the bend axis 5, with the main area of the platelet lying to the right of said line, while the area of the two arms 7 and 8 of the platelet - together with their filled vent holes - lie to the left of said axis.

Figure 3:
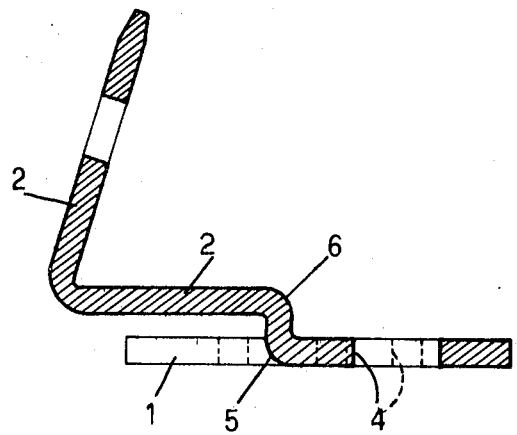
FIG. 3 is a similar section of a second embodiment of the connector.

The embodiment of FIG. 3 differs from that described in FIGS. 1 and 2 solely by the additional upward bend of the tongue 2. These bends impart resiliency to the tongue 2.

Summarizing, the advantages of the connector according to the present invention are that of preventing infiltrations of water between the platelet and the bus, which could create corrosion problems and furthermore, since the connector is generally located very near to the gasket of the automobile rear window, its flat form does not disturb the function of said gasket or weatherstrip. Furthermore the connection with the bus is very sturdy, because the surface of the soldered joint extends to both sides of the bend axis 5 and additionally because of the rivet effect caused by filling the vent holes 4 with solder. Another advantage is offered by the protective tin coat of the connector surfaces which has the purpose, in addition to improving the aspect of the joint, to eliminate its oxidation, which might cause faulty electric contacts and overheating of the same or an insufficient conduction of power to the heating system of the rear windows.

Although having described the invention in two of its preferred forms, it is obvious that many variants may be applied to it, especially to the shape of the tongue and of the platelet, without departing from the scope of the present invention.

What is claimed is:

1. A method of connecting an electrical connector to a bus conductor connected to a system of spaced-apart wires for electrically heating a window pane comprising, in combination:

providing a platelet having a tongue integral therewith and connectable to a power supply, bending said tongue to offset it from the remainder of said platelet, making a plurality of holes in said platelet to allow venting of gases which form between said platelet and said bus conductor during soldering, bringing one face of said platelet and solder into contact with said bus conductor and heating same to solder said platelet to said bus conductor while allowing gases to escape via said holes in said platelet, and subsequently pouring additional solder into said holes in said platelet, which additional solder fuses with solder beneath said platelet to anchor said platelet more firmly to said bus conductor.

2. A method according to claim 1, including, prior to bringing said one face of said platelet and solder into contact with said bus conductor, tin-plating at least said one face of said platelet, the tin thus plated on said at least one surface comprising said solder beneath said platelet.

3. A method according to claim 2, wherein said bending step provides that an area of said platelet which is to be soldered to said bus conductor extends on both sides of the axis of the bend.

4. A method according to claim 3, wherein the step of providing a platelet comprises providing a platelet which has a C-shaped portion, with said tongue of said platelet extending from the concave side of said C-shaped portion.

5. A method according to claim 4, wherein the step of providing a plurality of holes comprises providing holes in said C-shaped portion of said platelet on both sides of the axis of the bend which offsets said tongue.

6. A method according to Claim 5, wherein the step of bending said tongue comprises bending a portion of said tongue which is adjacent said C-shaped portion of said platelet upward and thereafter bending a section of said tongue adjacent said portion thereof horizontally away from said C-shaped portion.

7. A method according to Claim 6, wherein said bending step further includes bending part of said section of said tongue horizontally further away from said C-shaped portion.

8. An electrically heatable window pane comprising a system of spaced apart wires for electrically heating the pane, a bus conductor to which said wires are connected, and an electrical connector connectable to a power supply, said connector being made by:
providing a platelet having a tongue integral therewith and connectable to a power supply,
bending said tongue to offset it from the remainder of said platelet,
making a plurality of holes in said platelet to allow venting of gases which form between said platelet and said bus conductor during soldering,
bringing one face of said platelet and solder into contact with said bus conductor and heating same to solder said platelet to said bus conductor while allowing gases to escape via said holes in said platelet, and
subsequently pouring additional solder into said holes in said platelet, which additional solder fuses with solder beneath said platelet to anchor said platelet more firmly to said bus conductor.

* * * * *

UNITED STATES PATENT AND TRADEMARK OFFICE
CERTIFICATE OF CORRECTION

PATENT NO. : 3,981,556
DATED : September 21, 1976
INVENTOR(S) : SABATELLI et al

It is certified that error appears in the above-identified patent and that said Letters Patent are hereby corrected as shown below:

[73] Assignee: Società Italiana Vetro SIV S.p.A.

Signed and Sealed this

Third Day of May 1977

[SEAL]

Attest:

RUTH C. MASON
*Attesting Officer*

C. MARSHALL DANN
*Commissioner of Patents and Trademarks*